United States Patent
Najmi et al.

(10) Patent No.: US 11,589,221 B2
(45) Date of Patent: Feb. 21, 2023

(54) NETWORK KEY RECOVERY, NETWORK KEY RECOVERY MANAGEMENT, NETWORK KEY PROVISION, TERMINAL, SERVER AND ACCESS POINT IMPLEMENTING SAME

(71) Applicant: ORANGE, Issy-les-Moulineaux (FR)

(72) Inventors: Elyass Najmi, Chatillon (FR); Halim Bendiabdallah, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/520,822

(22) Filed: Jul. 24, 2019

(65) Prior Publication Data

US 2020/0037156 A1 Jan. 30, 2020

(30) Foreign Application Priority Data

Jul. 24, 2018 (FR) ...................... 1856842

(51) Int. Cl.
*H04W 12/0433* (2021.01)
*H04W 12/00* (2021.01)
*H04W 12/08* (2021.01)
*H04W 12/03* (2021.01)
(Continued)

(52) U.S. Cl.
CPC ....... *H04W 12/0433* (2021.01); *H04W 12/00* (2013.01); *H04W 12/03* (2021.01); *H04W 12/041* (2021.01); *H04W 12/0471* (2021.01); *H04W 12/08* (2013.01)

(58) Field of Classification Search
CPC ....... H04W 12/04033; H04W 12/0401; H04W 12/04071; H04W 12/001; H04W 12/00; H04W 12/08
See application file for complete search history.

(56) References Cited

U.S. PATENT DOCUMENTS

| 2009/0199300 A1* | 8/2009 | Matsubara ........ H04W 12/003 726/26 |
| 2010/0220856 A1 | 9/2010 | Kruys et al. |

(Continued)

OTHER PUBLICATIONS

French Search Report and Written Opinion dated May 9, 2019 for corresponding French Application No. 1856842, filed Jul. 24, 2018.

*Primary Examiner* — Jung W Kim
*Assistant Examiner* — Howard H. Louie
(74) *Attorney, Agent, or Firm* — David D. Brush; Westman, Champlin & Koehler, P.A.

(57) ABSTRACT

A method for recovering a network key of an access point to a network, implemented by a terminal. The network key allows the terminal to be associated with the access point upon a first connection of the terminal to the access point. The network key recovery method includes: receiving, by the terminal, a network key provided by the access point on a server following a request, by the terminal to the server, for the network key of the access point, the request including an identifier of the access point and having been relayed by the server to the access point associated with the identifier of the access point in the request. Thus, as the access point does not transmit the network key directly to the terminal, but to a server on which the terminal will recover it, this limits intrusions into the network linked to the vulnerability of the Wi-Fi network.

19 Claims, 6 Drawing Sheets

(51) Int. Cl.
*H04W 12/041* (2021.01)
*H04W 12/0471* (2021.01)

(56) References Cited

U.S. PATENT DOCUMENTS

| | | | |
|---|---|---|---|
| 2011/0047603 A1* | 2/2011 | Gordon | H04L 63/06 |
| | | | 726/5 |
| 2015/0139210 A1 | 5/2015 | Marin et al. | |
| 2015/0317467 A1 | 11/2015 | Rattner et al. | |
| 2016/0248738 A1* | 8/2016 | Brandsma | H04L 63/0435 |

* cited by examiner

NETWORK KEY RECOVERY, NETWORK KEY RECOVERY MANAGEMENT, NETWORK KEY PROVISION, TERMINAL, SERVER AND ACCESS POINT IMPLEMENTING SAME

FIELD OF THE DISCLOSURE

The invention relates to a network key recovery method, to a network key recovery management method, to a network key provision method, to a terminal, to a server and to an access point. The network key is in particular a key for associating a terminal with an access point via a wireless network such as a Wi-Fi network (registered trademark).

BACKGROUND OF THE DISCLOSURE

To connect a terminal (computer, smartphone, printer, camera, etc.) through a wireless network (in particular Wi-Fi) to an access point device to a communication network (in particular an Internet router or a gateway between a private network and a public network, such as the Internet), access points are provided with a network key, also called WEP (Wired Equivalent Privacy, that is to say securing of wireless access), WPA (Wi-Fi Protected Access) or WPA2 key (registered trademarks) depending on the standard that is used.

The network key may simply be written on the access point device, also colloquially called access point (for example on a label affixed directly to the access point and/or a label affixed to the packaging of the access point). The user wishing to connect a tablet to this access point via the Wi-Fi network will input the Wi-Fi key read from the access point on his tablet upon a request to connect to this access point. This first connection is therefore cumbersome because the network keys are often lengthy in order to avoid risks of intrusion into the private network. Furthermore, the security of the network depends on the location at which the access point is placed, because if it is accessible to a large number of people, said security will thereby be reduced since the network key is easily able to be read.

This network key may be modified by the users by way of an interface of the access point accessible via the Internet (either directly on an Internet page or via an application dedicated to the access point, such as the Ma Livebox application—registered trademark). The risk is then that of the user forgetting the modified network key, preventing any new association of a terminal with the access point, that is to say the addition of a terminal to the private network managed by the access point.

To facilitate this first connection for a large number of users, the network key affixed to the access point may be either replaced or combined with a barcode or a QR code containing the network key. However, the security of the private network in this case again depends on the location of the access point and its physical accessibility to third parties.

The WPS (Wi-Fi Protected Setup) standard itself also proposes to facilitate this first connection by proposing to generate a random network key stronger than the network key provided by the manufacturer of the access point. In order for this random network key to be known to the two equipments to be associated: the access point and the terminal (tablet, printer, smartphone, etc.), the WPS protocol includes a series of message exchanges between the access point and the terminal following an action by the user of the terminal which, when the series of exchanges is performed successfully, finishes by indicating that the protocol is complete, allowing the random network key to be transmitted and the first connection of the terminal to the access point.

The WPS standard provides several modes of operation:
two "out-of-band" modes, that is to say not using the Wi-Fi network for the series of exchanges of the WPS protocol:
the USB mode, in which the user connects the terminal to the access point using a USB port via which the series of exchanges of the WPS protocol is transmitted, and
the NFC mode, in which the user brings the terminal close to the access point in order to allow NFC (near field communication) communication.
The drawback of these two modes of implementation of the WPS is that it requires the terminal to be close to the access point with which the user wishes to associate it, which is not always possible: computer, television, printer, etc.
the PIN mode, in which the user enters an identification number of the access point (number read from the access point, in particular from a label glued to the access point or directly etched or printed thereon, or on a screen of the access point) on his terminal upon the first request to connect the terminal to the access point. The drawback of this method is that it is vulnerable to mass attacks.
the "pushbutton" mode, in which the user pushes a virtual or physical button on each of the two equipments to be associated: the terminal and the access point.
In these two last modes, the WPS exchanges are performed between the terminal and the access point via the Wi-Fi network following the action by the user (sending the PIN code to the access point and/or pressing the pushbuttons).

However, regardless of the technique used nowadays for the first connection of a terminal to an access point, this remains sensitive to third-party attacks and to the risks of intrusion by third parties into a private network via the access point.

SUMMARY

One of the aims of the present invention is to rectify drawbacks of the prior art.

One subject of the invention is a method for recovering a network key of an access point to a network, implemented by a terminal, the network key allowing the terminal to be associated with the access point upon a first connection of the terminal to the access point, the network key recovery method including reception, by the terminal, of a network key provided by an access point on a server following a request, by the terminal to the server, for the network key of the access point, the request including an identifier of the access point and having been relayed by the server to the access point associated with the identifier of the access point in the request. Thus, as the access point does not transmit the network key directly to the terminal, but to a server on which the terminal will recover it, this limits intrusions linked to the vulnerability of the Wi-Fi network into the private network managed by the access point.

Advantageously, the network key received by the terminal is contained in an encrypted message transmitted by the access point to the server. The recovery of the network key by the terminal is thus secured by virtue of the encryption. Specifically, if a third-party device intercepts the message recovered by the terminal on the server, it is not able to access the network key as it is encrypted. Advantageously, the network key recovery method includes decryption, by way of a private key generated by the terminal with a public key based on an identifier of the access point, of the encrypted message transmitted by the access point to the server, the message having been encrypted with the public key transmitted by the terminal to the access point and including the network key of the access point. Thus, only the requesting terminal is able to access the network key of the access point provided on the server, since it alone possesses the decryption key (private key), since only the encryption key (public key) has been transmitted via the server to the access point. Therefore, a third-party device will have access only to the public key, but not to the private key allowing decryption, and is therefore not able to decrypt the message even if the third-party device intercepts the encrypted message upon the recovery of the encrypted message by the terminal on the server.

Advantageously, the network key recovery method includes generation of an asymmetric key pair including a public key and a private key that are generated based on an identifier of the access point, the public key constituting the access point identifier contained in the request and encrypting the network key received by the terminal. Thus, only the terminal has both the public and private keys, as it does not request generation thereof by another device, thus increasing the security of the private network.

Advantageously, the network key recovery method includes transmission of a public key generated based on an identifier of the access point to the access point, the public key constituting the access point identifier contained in the request and encrypting the network key received by the terminal. Thus, the various (public and private) keys are generated upon each connection of the terminal to a new access point, limiting the risks of interception of the exchanges encrypted by the terminal.

Advantageously, the network key recovery method includes reception of a message from the access point, the message being encrypted with a public key and including the network key, the public key generated based on an identifier of the access point constituting the access point identifier contained in the request.

Advantageously, the network key is received by the terminal, via a network separate from the network associated with the network key, from the communicating server, via a network separate from the network associated with the network key, with the access point having transmitted the network key. The risks of interception of the exchanges between the terminal and the server are thus reduced, in particular when the network that is used for these exchanges is a mobile network, in particular 3G, 4G or 5G, whereas the public key is a Wi-Fi key (such as WEP, WPA or WPA2).

Advantageously, the network key recovery method includes reception, by the terminal, of a notification of availability of the network key transmitted by the server following reception, by the server, of the network key from the access point, said reception of the notification authorizing the terminal to recover the network key from the server. The network key is thus not sent directly by the server to the terminal following the request from the terminal to the server, further reducing the risks of interception.

Advantageously, after the network key is provided on the server by the access point, the reception of the network key by the terminal is triggered by the access point following a physical action on the access point by a user of the terminal. Thus, third-party users who do not have access to the access point are not able to intercept the network key.

Advantageously, the provision of the network key on the server by the access point PA has a limited duration. The interception of the network key is thus restricted to this provision duration, thereby making it more complex.

One subject of the invention is also a method for managing the recovery of a network key of an access point to a network, implemented by a server, the network key allowing the terminal to be associated with the access point upon a first connection of the terminal to the access point, the network key recovery management method including transmission, by the server to a terminal, of a network key provided by an access point on the server following a request, by the terminal to the server, for the network key of the access point, the request including an identifier of the access point and having been relayed by the server to the access point associated with the identifier of the access point in the request.

One subject of the invention is also a method for providing a terminal with a network key of an access point to a network, implemented by an access point, the network key allowing the terminal to be associated with the access point upon a first connection of the terminal to the access point, the network key device providing method including transmission, by the access point to a server, destined for a terminal, of a network key following a request, by the terminal to the server, for the network key of the access point, the request including an identifier of the access point and having been relayed by the server to the access point associated with the identifier of the access point in the request.

Advantageously, according to one implementation of the invention, the various steps of the method according to the invention are implemented by software or a computer program, this software comprising software instructions intended to be executed by a data processor of a device forming, respectively, part of a terminal, a server or an access point and being designed to command the execution of the various steps of this method. The invention therefore also targets a program comprising program code instructions for executing the steps of the network key recovery method, and/or of the recovery management method and/or of the provision method when said program is executed by a processor. This program may use any programming language, and be in the form of source code, object code, or intermediate code between source code and object code, such as in a partially compiled form, or in any other desirable form.

One subject of the invention is a terminal including an interface for recovering a network key of an access point to a network, implemented by a terminal, the network key allowing the terminal to be associated with the access point upon a first connection of the terminal to the access point, the recovery interface including a receiver for receiving a network key provided by an access point on a server following a request, by the terminal to the server, for the network key of the access point, the request including an identifier of the access point and having been relayed by the server to the access point associated with the identifier of the access point in the request.

One subject of the invention is also a server including a manager for managing the recovery of a network key of an access point to a network, implemented by a server, the network key allowing the terminal to be associated with the access point upon a first connection of the terminal to the access point, the network key recovery manager including a transmitter for transmitting, to a terminal, a network key provided by an access point on the server following a request, by the terminal to the server, for the network key of the access point, the request including an identifier of the access point and having been relayed by the server to the access point associated with the identifier of the access point in the request.

One subject of the invention is also an access point to a network including a network key provider able to provide a terminal with a network key, the network key allowing the terminal to be associated with the access point upon a first connection of the terminal to the access point, the network key provider including a transmitter for transmitting, to a server, destined for a terminal, a network key following a request, by the terminal to the server, for the network key of the access point, the request including an identifier of the access point and having been relayed by the server to the access point associated with the identifier of the access point in the request.

BRIEF DESCRIPTION OF THE DRAWINGS

The features and advantages of the invention will become more clearly apparent upon reading the description, given by way of example, and the attached figures, in which.

DETAILED DESCRIPTION OF ILLUSTRATIVE EMBODIMENTS

In one particular case of use, the network key is a key for accessing a private and/or public network via a Wi-Fi network, using a Wi-Fi access point with which this network key is associated. The network key is in particular a WEP, WPA or WPA2, etc. key.

In one particular case of use that is different from or the same as the previous case of use, the access point is a network router, in particular an access router and/or a gateway between a public network and a private network and/or a module for accessing a public network, such as the Internet, also colloquially called "box", such as the Livebox (registered trademark).

Figure 1:
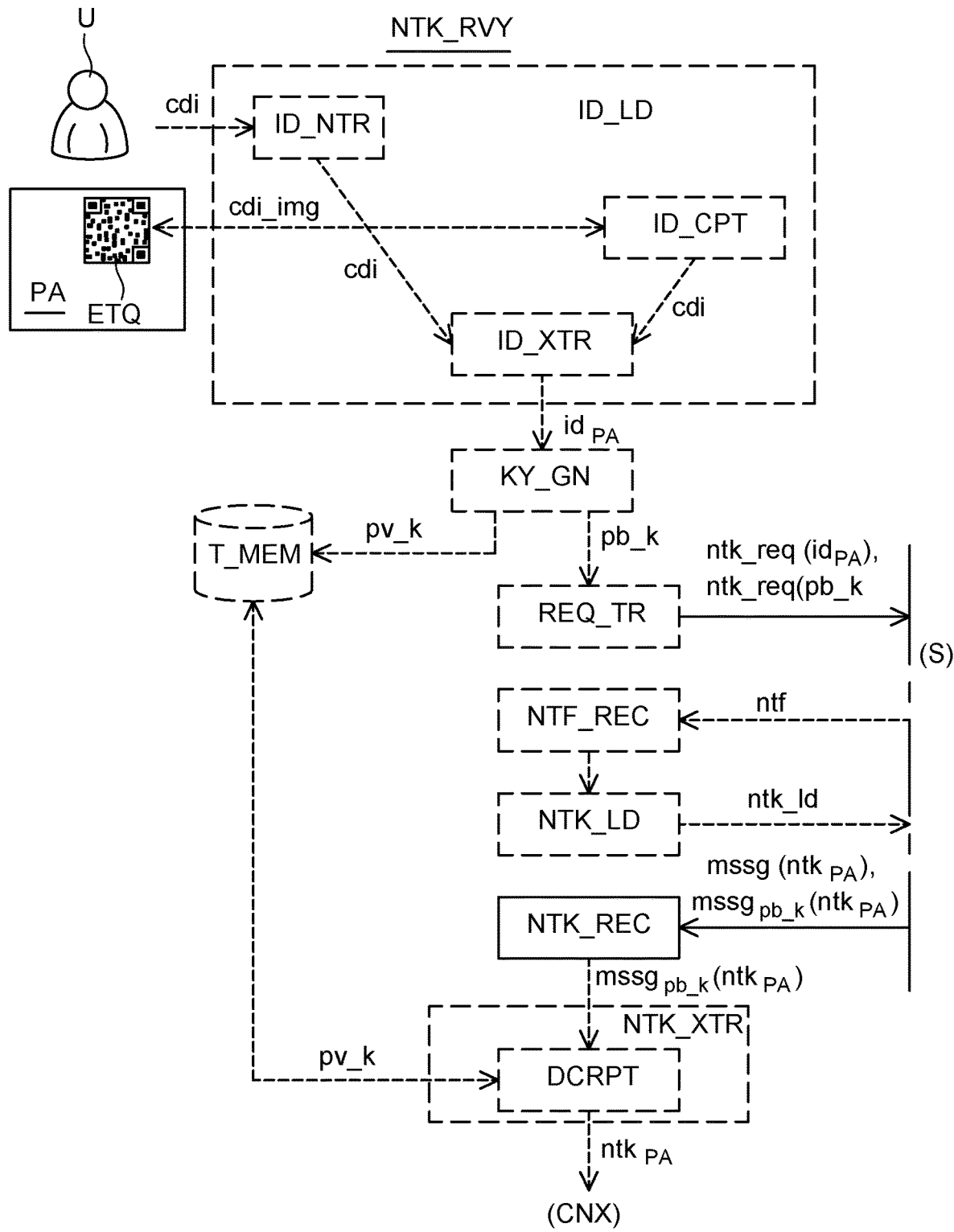
FIG. 1 shows a simplified diagram of a method for recovering a network key of an access point by a terminal according to the invention.

FIG. 1 illustrates a simplified diagram of a method for recovering a network key of an access point by a terminal according to the invention.

The method for recovering NTK_RVY a network key of an access point $ntk_{PA}$ to a network is implemented by a terminal T. The network key $ntk_{PA}$ allows the terminal T to be associated with the access point PA upon a first connection of the terminal T to the access point PA. The network key recovery method NTK_RVY includes reception NTK_REC, by the terminal T, of a network key $ntk_{PA}$ provided by an access point PA on a server S following a request ntk_req, by the terminal T to the server S, for the network key of the access point. The request ntk_req includes an identifier of the access point $id_{PA}$ and is relayed by the server S to the access point PA associated with the identifier of the access point $id_{PA}$ in the request ntk_req.

In particular, the network key $ntk_{PA}$ received by the terminal T is contained in an encrypted message $mssg_{pb\_k}$ transmitted by the access point PA to the server S.

In particular, the network key recovery method NTK_RVY includes decryption DCRPT, by way of a private key pv_k generated by the terminal T with a public key pb_k based on an identifier of the access point $id_{PA}$, of the encrypted message $MSSg_{pb\_k}$ transmitted by the access point PA to the server S. The message mssg has been encrypted with the public key pb_k transmitted by the terminal T to the access point PA and includes the network key of the access point $ntk_{PA}$.

In particular, the network key recovery method NTK_RVY includes generation KY_GN of an asymmetric key pair (pb_k, pv_k) including a public key pb_k and a private key pv_k that are generated based on an identifier of the access point $id_{PA}$. The public key pb_k constitutes the access point identifier contained in the request ntk_req and encrypts the network key $ntk_{PA}$ received by the terminal T.

In particular, the network key recovery method NTK_RVY includes transmission REQ_TR of a public key pb_k generated based on an identifier of the access point $id_{PA}$ to the access point PA.

The public key pb_k constitutes the access point identifier contained in the request ntk_req and encrypts the network key $ntk_{PA}$ received by the terminal T.

In particular, the network key recovery method NTK_RVY includes reception NTK_REC of a message $mssg(ntk_{PA})$, $mssg_{pb\_k}(ntk_{PA})$ from the access point PA. The message $mssg_{pb\_k}(ntk_{PA})$ is encrypted with a public key pb_k and includes the network key $ntk_{PA}$. The public key pb_k generated based on an identifier of the access point $id_{PA}$ constitutes the access point identifier PA contained in the request ntk_req.

In particular, the network key $ntk_{PA}$ is received by the terminal T, via a network separate from the network associated with the network key, from the communicating server S, via a network separate from the network associated with the network key, with the access point PA having transmitted the network key $ntk_{PA}$. In particular, the network key is associated with a wireless local area network such as a Wi-Fi, Li-Fi, etc. network (registered trademarks), and the network used for the exchanges between the terminal T and server S is in particular a mobile network, such as 3G, 4G, 5G, Edge, etc. (registered trademarks); the network used for the exchanges between the server S and the access point PA may again be a mobile network or a wired network (ADSL, XDSL, fiber, etc.).

In particular, the network key recovery method NTK_RVY includes reception NTF_REC, by the terminal T, of a notification ntf of availability of the network key $ntk_{PA}$ transmitted by the server S following reception, by the server S, of the network key $ntk_{PA}$ from the access point PA. Said reception of the notification NTF_REC authorizes the terminal T to recover the network key $ntk_{PA}$ from the server S.

In particular, after the network key $ntk_{PA}$ is provided on the server S by the access point PA, the reception of the network key by the terminal NTK_REC is triggered psh by the access point PA following a physical action a on the access point PA by a user U of the terminal T.

Advantageously, the provision of the network key $ntk_{PA}$ on the server S by the access point PA has a limited duration.

In particular, the network key recovery method NTK_RVY includes identification ID_LD of the access point PA that the user U wishes to connect to the terminal T implementing the network key recovery method NTK_RVY.

In particular, when a user U wishes to connect a terminal to an access point PA, he inputs an identifier or an activation code cdi read from the access point PA on his terminal T, or captures an activation code of the access point PA by way of his terminal T (photograph, scan, etc.). The activation code is either etched or printed on the housing of the access point PA or on a label affixed to the housing of the access point PA or displayed on a screen of the access point PA. The activation code is in particular a series of characters (numbers, letters or symbols), a barcode, a QR code, etc. In particular, if the user inputs an identifier or an activation code on his terminal, the network key recovery method NTK_RVY includes reading the input ID_NTR providing the activation code or the identifier of the access point cdi. In particular, if the activation code cdi is captured, the network key recovery method NTK_RVY includes capturing ID_CPT of the activation code cdi, in particular in the form of an image cdi_img. The network key recovery method NTK_RVY thus includes identification of the access point ID_LD, including in particular reading of the input ID_NTR and/or capturing ID_CPT of the activation code and/or of the identifier cdi of the access point PA.

In particular, if the access point PA is identified by an activation code cdi and not an identifier in the terminal, the network key recovery method NTK_RVY includes extraction ID_XTR of the identifier of the access point $id_{PA}$ from the activation code. The identification of the access point ID_LD possibly includes extraction of the identifier ID_XTR.

In particular, the identification of the access point ID_LD transmits REQ_TR the identifier of the access point either directly to the server S in the network key request ntk_req ($id_{PA}$) destined for the access point, or provides it to an encryption key generation KY_GN, which then provides an encryption key pb_k to the server S in the network key request ntk_req(pb_k) destined for the access point, depending on the identifier of the access point $id_{PA}$. In the alternative case in which the network key request includes an encryption key pb_k, this encryption key pb_k will be used by the access point to encrypt the network key $ntk_{PA}$ provided on the server S by the access point PA. This encryption key generation KY_GN is in particular contained in the network key recovery method NTK_RVY.

The encryption key generation KY_GN is in particular a generation of asymmetric keys providing a key pair: public key pb_k transmitted to the server in order to encrypt the response messages, and private key pv_k kept in the terminal, for example in a memory T_MEM or a database, in order to decrypt the response messages (in particular decrypt the network key $ntk_{PA}$ provided by the access point PA on the server S).

In particular, the network key recovery method NTK_RVY includes a network key request generation REQ_GN (not illustrated) which provides, to the transmission request REQ_TR, the network key request ntk_req including the identifier of the access point either directly $id_{PA}$ or in the encryption key pb_k which transmits, to the server S, the network key request ntk_req($id_{PA}$), ntk_req(pb_k) destined for the access point PA.

In particular, following the reception NTF_REC, by the terminal T, of a notification ntf of availability of the network key $ntk_{PA}$ transmitted by the server S, the network key recovery method NTK_RVY includes loading of the network key NTK_LD which sends, to the server, a load command ntk_ld to trigger the transmission, by the server, of the network key (encrypted or unencrypted depending on the mode of transmission of the network key request implemented by the recovery method), following which the network key recovery method NTK_RVY includes reception of the network key NTK_REC.

If the received network key $ntk_{PA}$ is either directly encrypted $ntk_{PA,pb\_k}$ or contained in an encrypted message $mssg_{pb\_k}(ntk_{PA})$, the network key recovery method NTK_RVY includes decryption of the network key DCRPT respectively providing the network key $ntk_{PA}$, or the decrypted message mssg from which the network key $ntk_{PA}$ is extracted (NTK_XTR not illustrated).

The network key recovery method NTK_RVY provides the network key of the access point $ntk_{PA}$ from the server S to a method for connecting CNX a terminal to an access point implemented by the terminal.

One particular embodiment of the recovery method NTK_RVY is a program comprising program code instructions for executing the steps of the network key recovery method when said program is executed by a processor.

Figure 2:
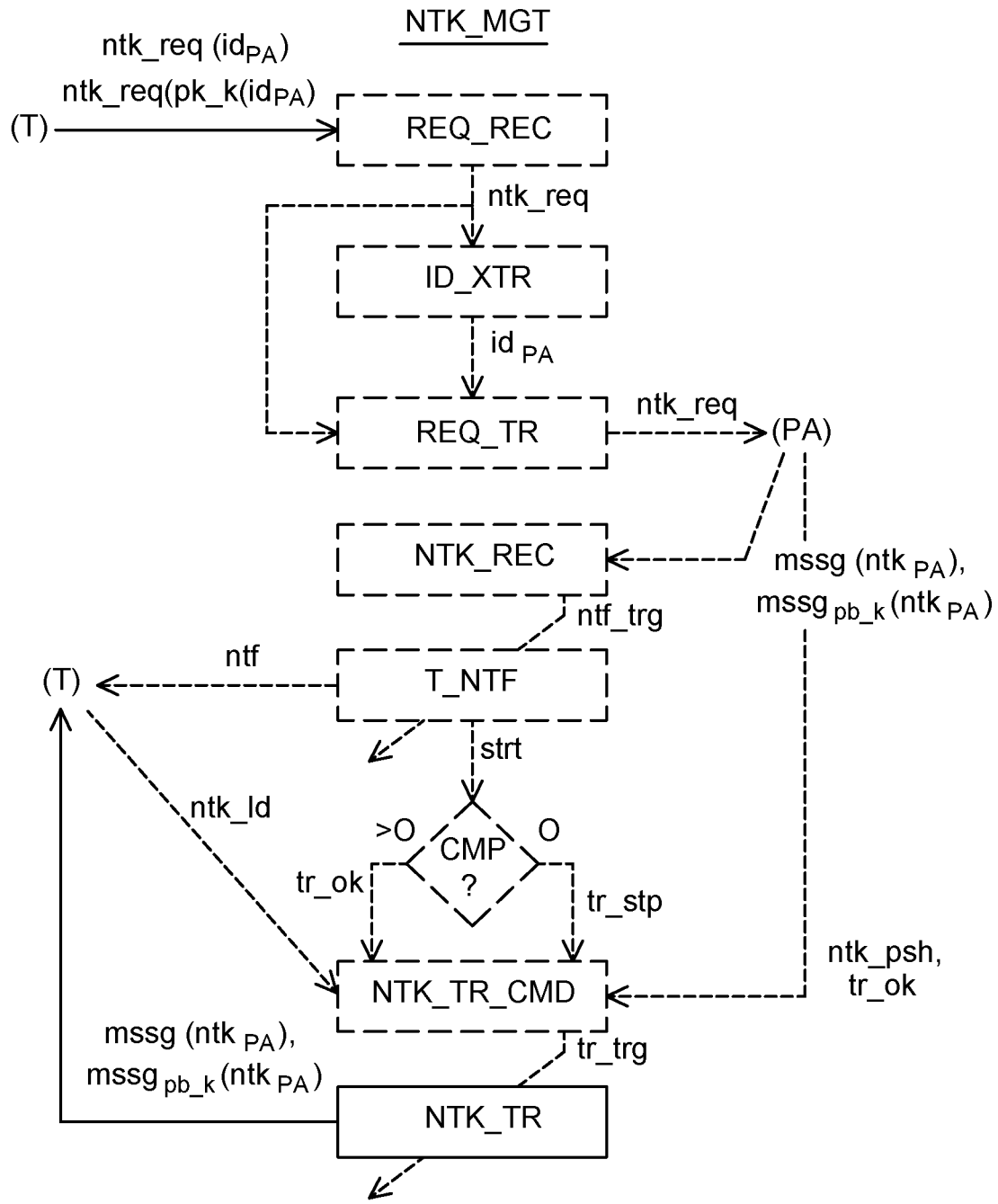
FIG. 2 shows a simplified diagram of a method for managing the recovery of a network key of an access point implemented by a server according to the invention.

FIG. 2 illustrates a simplified diagram of a method for managing the recovery of a network key of an access point implemented by a server according to the invention.

The method for managing NTK_MGT the recovery of a network key of an access point to a network $ntk_{PA}$ is implemented by server S. The network key $ntk_{PA}$ allows the terminal T to be associated with the access point PA upon a first connection of the terminal T to the access point PA. The network key recovery management method NTK_MGT includes transmission NTK_TR, by the server S to a terminal T, of a network key $ntk_{PA}$ provided by an access point PA on a server S following a request ntk_req, by the terminal T to the server S, for the network key of the access point. The request ntk_req includes an identifier of the access point $id_{PA}$ and is relayed by the server S to the access point PA associated with the identifier of the access point $id_{PA}$ in the request ntk_req.

In particular, the network key recovery management method NTK_MGT includes reception REQ_REC of a network key request nkt_req($id_{PA}$), nkt_req(pb_k) transmitted by the terminal T to the server S destined for the access point PA depending on an identifier of the access point $id_{PA}$.

In particular, the network key recovery management method NTK_MGT includes extraction ID_XTR of the identifier of the access point from the network key request ntk_req. The extracted access point identifier $id_{PA}$ is provided to the request transmission REQ_TR contained in the network key recovery management method NTK_MGT. The request transmission REQ_TR then relays the network key request ntk_req received from the terminal T to the access point PA thus identified $id_{PA}$.

Figure 5:
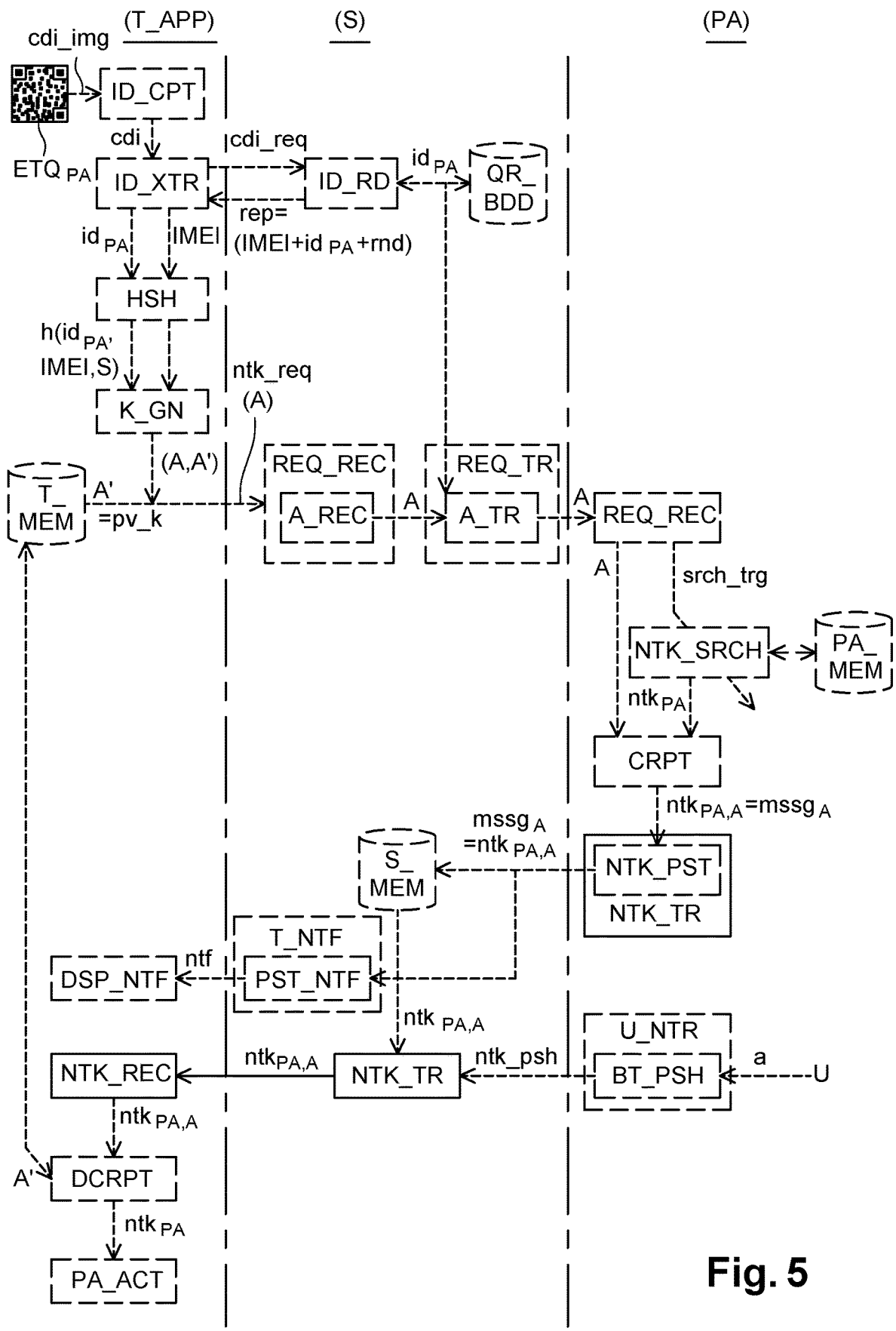
FIG. 5 shows a simplified diagram of the exchanges according to the invention in one particular embodiment.

In one alternative embodiment illustrated by FIG. 5, the identifier of the access point $id_{PA}$ is known to the server S following reading ID_RD of the identifier of the access point $id_{PA}$ from an activation code database, in particular QR code database QR_BDD, by the server S on request from the terminal T upon the extraction of the identifier ID_XTR by the terminal T. Thus, when the server S receives REQ_REC the network key request ntk_req from the terminal T, as the server S already has the identifier of the access point $id_{PA}$, it transmits REQ_TR the network key request ntk_req received from the terminal T to the access point PA thus identified $id_{PA}$.

Following the transmission REQ_TR, by the server S, of the network key request ntk_req received from the terminal T to the access point PA, the network key recovery management method NTK_MGT includes reception of the network key NTK_REC. The reception of the network key NTK_REC possibly includes storage (not illustrated), in a memory of the server S, of the network key following a command to write the network key to the server S transmitted by the access point PA. The network key is received by the server either on its own $ntk_{PA}$, or in a message mssg, and/or encrypted by way of the encryption key provided or not provided by the network key request pb_k.

The reception of the network key NTK_REC by the server S directly or indirectly (that is to say with intermediate steps) triggers the transmission of the network key NTK_TR to the requesting terminal T as received from the access point, that is to say, respectively, either on its own $ntk_{PA}$, or in a message mssg, and/or encrypted by way of the encryption key provided or not provided by the network key request pb_k.

If the transmission of the network key NTK_TR is triggered indirectly, the network key recovery management method NTK_MGT includes at least notification of the availability of the network key T_NTF transmitting a notification message ntf to the terminal T. This notification T_NTF possibly results from the storage of the received network key $ntk_{PA}$ in the server S, either by writing by the access point PA or following the reception of the network key by the server NTK_REC. The reception of the network key by the server NTK_REC then triggers ntf_trg the notification T_NTF.

In particular, the provision of the network key on the server S by the access point PA has a limited duration.

Depending on the type of notification ntf, the network key recovery management method NTK_MGT includes a command to transmit the network key NTK_TR_CMD depending on at least one of the following messages:
  a request to load the network key ntk_ld received from the terminal;
  a transmission authorization ok_tr provided by the access point PA following an action by the user of the terminal T on the access point;
  a distribution command ntk_psh sent by the access point PA following an action by the user of the terminal T on the access point;
  a transmission authorization ok_tr provided by a timer triggered by the notification T_NTF if the determined duration counted down by the timer has not expired;
  etc.

For example, after notification of the provision of the network key T_NTF, if the user U performs a predetermined action on the access point PA, the network key recovery management method NTK_MGT will receive a distribution command ntk_psh sent by the access point PA, which will trigger the step of commanding transmission of the network key NTK_TR_CMD.

Possibly, when the network key recovery management method NTK_MGT includes a countdown CMP of a predetermined duration, the step of commanding transmission of the network key NTK_TR_CMD, following the reception of the distribution command ntk_psh sent by the access point PA, will be triggered only if the countdown CMP has not ended (countdown strictly greater than zero >0) and give a transmission authorization tr_ok. Therefore, the step of commanding transmission of the network key NTK_TR_CMD receiving the distribution command ntk_psh will trigger tr_trg the transmission NTK_TR of the network key on the server S to the terminal T.

If the countdown CMP has ended (countdown equal to zero 0), it prohibits the transmission tr_stp. Therefore, the step of commanding transmission of the network key NTK_TR_CMD receiving the distribution command ntk_psh will not trigger the transmission NTK_TR.

One alternative embodiment is the reception, by the server S, in the step of commanding transmission of the network key NTK_TR_CMD, of a load request ntk_ld from the terminal T. Either the command to transmit the network key NTK_TR_CMD then automatically triggers tr_trg the transmission NTK_TR of the network key from the server S to the terminal T, or the command to transmit the network key NTK_TR_CMD waits, before triggering tr_trg the transmission NTK_TR of the network key from the server S to the terminal T, for an authorization tr_ok from the access point PA and/or from the countdown CMP.

For example, after notification of the provision of the network key T_NTF, if the user U performs a predetermined action on the access point PA at a given time in relation to the load request ntk_ld (before, at the same time or after), the network key recovery management method NTK_MGT will receive a transmission authorization tr_ok sent by the access point PA, which will trigger the step of commanding transmission of the network key NTK_TR_CMD.

Possibly, when the network key recovery management method NTK_MGT includes a countdown CMP of a predetermined duration, the step of commanding transmission of the network key NTK_TR_CMD, following the reception of the load request sent by the terminal T, will be triggered only if the countdown CMP has not ended (countdown strictly greater than zero >0) and give a transmission authorization tr_ok. Therefore, the step of commanding transmission of the network key NTK_TR_CMD receiving the load request ntk_ld will trigger tr_trg the transmission NTK_TR of the network key on the server S to the terminal T.

If the countdown CMP has ended (countdown equal to zero 0), it prohibits the transmission tr_stp. Therefore, the step of commanding transmission of the network key NTK_TR_CMD receiving the distribution command ntk_psh will not trigger the transmission NTK_TR.

Possibly, the transmission NTK_TR will be triggered following the load request ntk_ld only if both the access point PA and the countdown CMP authorize this tr_ok. The transmission NTK_TR will not be performed following the load request ntk_ld if at least the countdown CMP prohibits this tr_stp (as the load request ntk_ld and/or the transmission authorization from the access point tr_ok is (are) received when the predetermined load time has expired) or if the access point PA does not send authorization tr_ok.

One particular embodiment of the network key recovery management method NTK_MGT is a program comprising program code instructions for executing the steps of the recovery management method when said program is executed by a processor.

Figure 3:
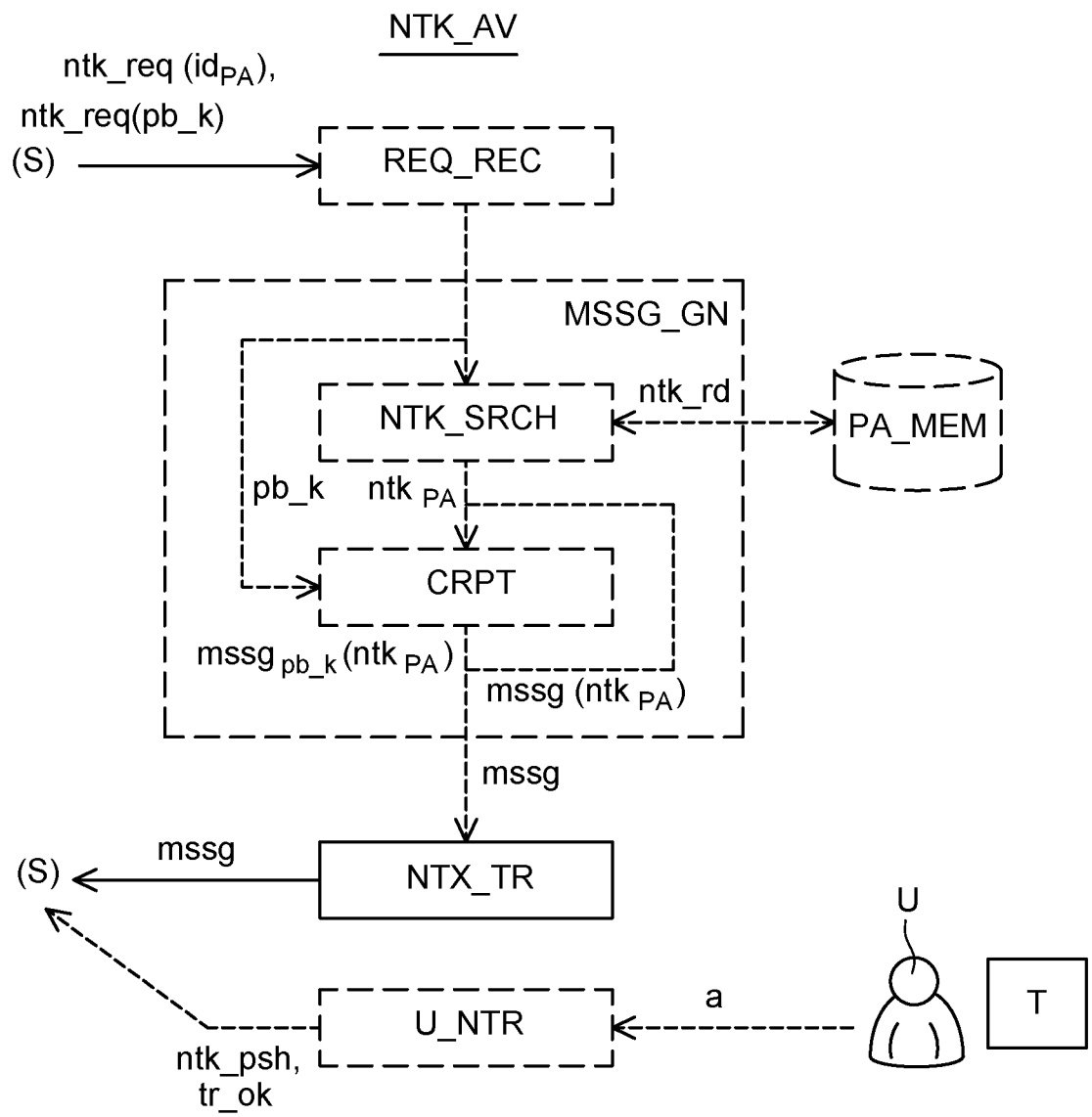
FIG. 3 shows a simplified diagram of providing a terminal on a server with a network key by way of an access point according to the invention.

FIG. 3 illustrates a simplified diagram of providing a terminal on a server with a network key by way of an access point according to the invention.

The method for providing NTK_AV a terminal T with a network key of an access point $ntk_{PA}$ to a network is implemented by an access point PA. The network key $ntk_{PA}$ allows the terminal T to be associated with the access point PA upon a first connection of the terminal T to the access point PA. The network key provision method NTK_AV includes transmission NTK_TR, by the access point PA to a server S, destined for a terminal T, of a network key $ntk_{PA}$ following a request ntk_req, by the terminal T to the server S, for the network key of the access point PA. The request ntk_req includes an identifier of the access point $id_{PA}$ and is relayed by the server S to the access point PA associated with the identifier of the access point $id_{PA}$ in the request ntk_req.

In particular, the network key provision method NTK_AV includes reception REQ_REC of a network key request nkt_req($id_{PA}$), nkt_req(pb_k) transmitted by the terminal T and relayed by the server S to the access point PA depending on an identifier of the access point $id_{PA}$.

In particular, the network key provision method NTK_AV includes searching NTK_SRCH for the network key of the access point, in particular in a memory of the access point PA_MEM or a database of the access point PA. Searching NTK_SRCH for the network key of the access point involves in particular reading the network key ntk_rd from the memory PA_MEM or any other storage device of the access point.

The network key provision method NTK_AV possibly includes generation of a message MSSG_GN destined for the requesting terminal T. The message mssg includes at least the read network key $ntk_{PA}$ (read from the memory for example) and is possibly encrypted by a key pb_k received in the network key request ntk_req(pb_k). The message generation MSSG_GN then in particular includes encryption CRPT using this encryption key pb_k provided by the network key request ntk_req(pb_k). The encryption CRPT encrypts either just the network key $ntk_{PA}$ or all or part of the generated message mssg including the network key $ntk_{PA}$.

The network key transmission NTK_TR then transmits, to the server S, either the encrypted or unencrypted network key $ntk_{PA}$ directly, or the generated message mssg provided by the message generation MSSG_GN, that is to say an encrypted message $mssg_{pb\_k}(ntk_{PA})$ or unencrypted message mssg ($ntk_{PA}$).

Depending on the mode of operation of the network key recovery management method NTK_MGT implemented by the server to which the key is provided, the user U needs to perform an action a on the access point PA. The network key provision method NTK_AV then includes capturing of the user input U_NTR, which transmits either a distribution command ntk_psh or a transmission authorization tr_ok to the server S, triggering the transmission, by the server S to the terminal T, of the network key $ntk_{PA}$.

One particular embodiment of the network key provision method NTK_AV performed by an access point is a program comprising program code instructions for executing the steps of the provision method when said program is executed by a processor.

Figure 4:
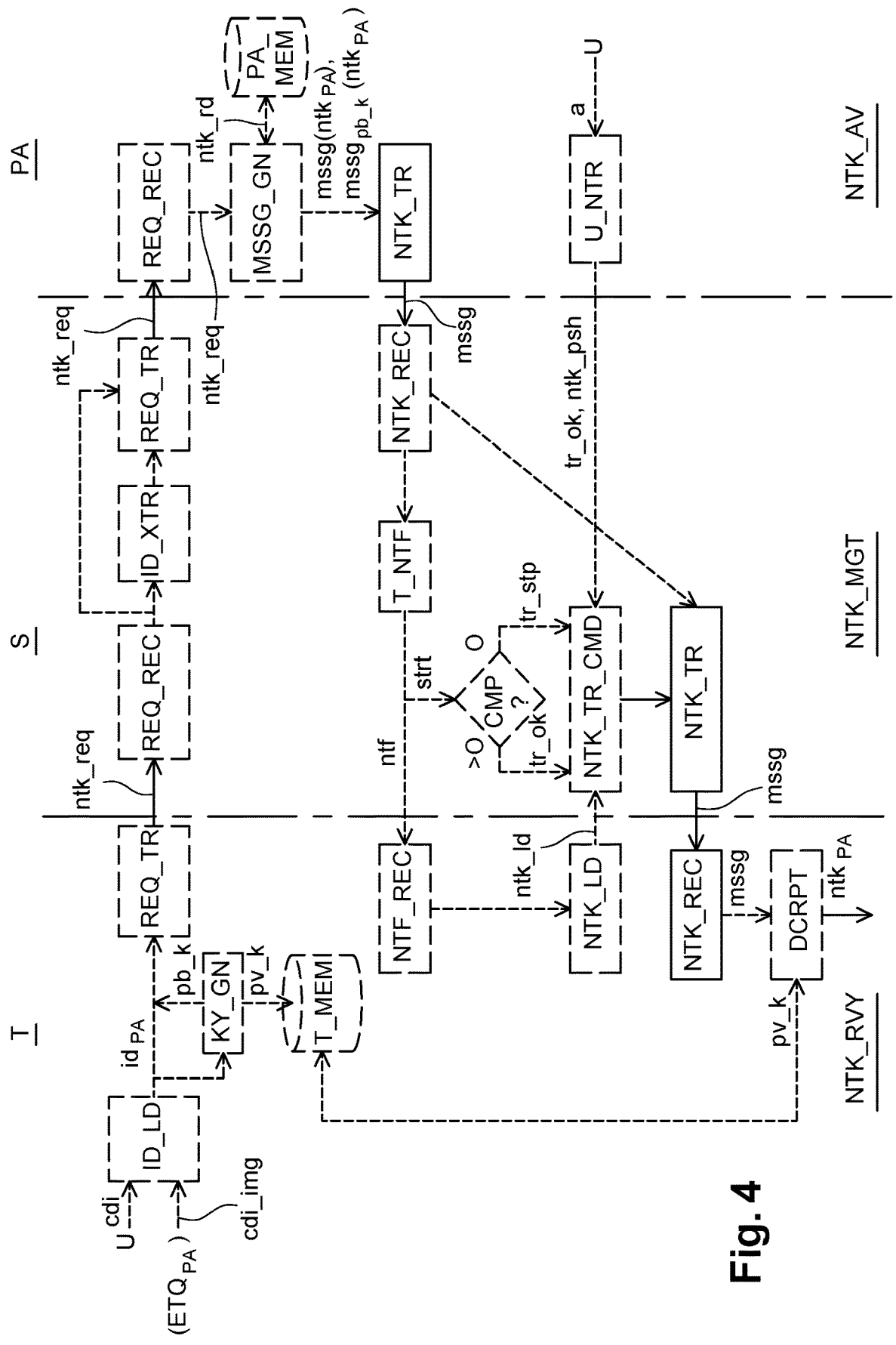
FIG. 4 shows a simplified diagram of the exchanges in a communication architecture implementing the methods for recovering a network key, for managing the recovery of a network key and for providing a network key according to the invention.

FIG. 4 illustrates a simplified diagram of the exchanges in a communication architecture implementing the methods for recovering a network key NTK_RVY, for managing the recovery of a network key NTK_MGT and for providing a network key NTK_AV according to the invention.

The communication architecture implementing the invention includes a terminal T that the user U wishes to connect to an access point PA, and a server S used to recover the network key.

In particular, the terminal T implements identification ID_LD of the access point PA that the user U wishes to connect to the terminal T implementing the network key recovery method NTK_RVY.

In particular, when a user U wishes to connect a terminal to an access point PA, he inputs an identifier or an activation code cdi read from the access point PA on his terminal T, or captures an activation code of the access point PA by way of his terminal T (photograph, scan, etc.). The activation code is either etched or printed on the housing of the access point PA or on a label $ETQ_{PA}$ affixed to the housing of the access point PA or displayed on a screen of the access point PA.

In particular, upon the identification of the access point ID_LD, the terminal T transmits REQ_TR the identifier of the access point either directly to the server S in the network key request ntk_req($id_{PA}$) destined for the access point, or implements an encryption key generation KY_GN depending on this identifier. When the terminal T implements the key generation, it then provides the server S, in the network key request ntk_req(pb_k) destined for the access point, with an encryption key pb_k depending on the identifier of the access point $id_{PA}$. In the alternative case in which the network key request includes an encryption key pb_k, this encryption key pb_k will be used by the access point to encrypt the network key $ntk_{PA}$ provided on the server S by the access point PA. This encryption key generation KY_GN is in particular contained in the network key recovery method NTK_RVY.

In particular, the server S implementing the network key recovery management method NTK_MGT receives REQ_REC the network key request nkt_req($id_{PA}$), nkt_req(pb_k) transmitted by the terminal T to the server S destined for the access point PA depending on an identifier of the access point $id_{PA}$.

In particular, the server S implements extraction ID_XTR of the identifier of the access point from the network key request ntk_req. The extracted access point identifier $id_{PA}$ is provided to the request transmission REQ_TR implemented by the server S. The request transmission REQ_TR then relays the key request ntk_req received from the terminal T to the access point PA thus identified $id_{PA}$.

In particular, the access point PA implementing the network key provision method NTK_AV receives REQ_REC the network key request nkt_req($id_{PA}$), nkt_req(pb_k) transmitted by the terminal T and relayed by the server S to the access point PA depending on an identifier of the access point $Id_{PA}$.

In particular, the access point PA searches NTK_SRCH for the network key of the access point, in particular in a memory of the access point PA_MEM or a database of the access point PA. Searching NTK_SRCH for the network key of the access point involves in particular reading the network key ntk_rd from the memory PA_MEM or any other storage device of the access point.

The access point PA possibly generates a message MSSG_GN destined for the requesting terminal T. The message mssg includes at least the read network key $ntk_{PA}$ (read from the memory for example) and is possibly encrypted by a key pb_k received in the network key request ntk_req(pb_k). The message generation MSSG_GN then in particular includes encryption (illustrated by FIG. 3) using this encryption key pb_k provided by the network key request ntk_req(pb_k). The encryption implemented by the terminal encrypts either just the network key $ntk_{PA}$ or all or part of the generated message mssg including the network key $ntk_{PA}$.

The access point PA then transmits NTK_TR, to the server S, either the encrypted or unencrypted network key $ntk_{PA}$ directly, or the generated message mssg provided by the message generation MSSG_GN, that is to say an encrypted message $mssg_{pb\_k}(ntk_{PA})$ or unencrypted message mssg ($ntk_{PA}$).

Following this, the server implementing the network key recovery management method NTK_MGT receives the network key from the access point PA. The reception of the network key NTK_REC possibly includes storage (not illustrated), in a memory of the server S, of the network key following a command to write the network key to the server S transmitted by the access point PA. The network key is received by the server either on its own $ntk_{PA}$, or in a message mssg, and/or encrypted by way of the encryption key provided or not provided by the network key request pb_k.

The reception of the network key NTK_REC by the server S directly or indirectly (that is to say with intermediate steps) triggers the transmission, by the server S, of the network key NTK_TR to the requesting terminal T as received from the access point, that is to say, respectively, either on its own $ntk_{PA}$, or in a message mssg, and/or encrypted by way of the encryption key provided or not provided by the network key request pb_k.

If the transmission of the network key NTK_TR is triggered indirectly, the server S notifies the availability of the network key T_NTF by transmitting a notification message ntf to the terminal T. This notification T_NTF possibly results from the storage of the received network key $ntk_{PA}$ in the server S, either by writing by the access point PA or following the reception of the network key by the server NTK_REC. The reception of the network key by the server NTK_REC then triggers ntf_trg the notification T_NTF.

Depending on the type of notification ntf, the network key recovery management method NTK_MGT includes a command to transmit the network key NTK_TR_CMD depending on at least one of the following messages:
- a request to load the network key ntk_ld received from the terminal;
- a transmission authorization ok_tr provided by the access point PA following an action by the user of the terminal T on the access point;
- a distribution command ntk_psh sent by the access point PA following an action by the user of the terminal T on the access point;
- a transmission authorization ok_tr provided by a timer triggered by the notification T_NTF if the determined duration counted down by the timer has not expired; etc.

For example, after a notification, by the server S, of the provision of the network key T_NTF, depending on the mode of operation of the network key recovery management method NTK_MGT implemented by the server to which the key is provided, the user U needs to perform an action a on the access point PA. The access point PA captures the user input U_NTR and transmits a distribution command ntk_psh to the server S. The server S will receive the distribution command ntk_psh sent by the access point PA, which will trigger the step of commanding transmission of the network key NTK_TR_CMD.

Possibly, when the server S implements a countdown CMP of a predetermined duration, the step of commanding transmission of the network key NTK_TR_CMD, following the reception of the distribution command ntk_psh sent by the access point PA, will be triggered only if the countdown CMP has not ended (countdown strictly greater than zero >0) and give a transmission authorization tr_ok. Therefore, the step of commanding transmission of the network key NTK_TR_CMD receiving the distribution command ntk_psh will trigger tr_trg the transmission NTK_TR of the network key on the server S to the terminal T.

If the countdown CMP has ended (countdown equal to zero 0), it prohibits the transmission tr_stp. Therefore, the step of commanding transmission of the network key NTK_TR_CMD receiving the distribution command ntk_psh will not trigger the transmission NTK_TR.

One alternative embodiment, following the reception NTF_REC, by the terminal T, of a notification ntf of availability of the network key $ntk_{PA}$ transmitted by the server S, is that the terminal T implements loading of the network key NTK_LD which sends, to the server, a load command ntk_ld to trigger the transmission, by the server S, of the network key (encrypted or unencrypted depending on the mode of transmission of the network key request implemented by the recovery method), following which the network key recovery method NTK_RVY includes reception of the network key NTK_REC.

Possibly, either the command to transmit the network key NTK_TR_CMD implemented by the server S then automatically triggers tr_trg the transmission NTK_TR of the network key from the server S to the terminal T, or the command to transmit the network key NTK_TR_CMD implemented by the server S waits, before triggering tr_trg the transmission NTK_TR of the network key from the server S to the terminal T, for an authorization tr_ok from the access point PA and/or from the countdown CMP.

For example, after notification of the provision of the network key T_NTF, when the user U performs a predetermined action on the access point PA at a given time in relation to the load request ntk_ld (before, at the same time or after), the access point PA captures the user input U_NTR and transmits a transmission authorization tr_ok to the server S. The network key recovery management method NTK_MGT will receive a transmission authorization tr_ok sent by the access point PA, which will trigger the step of commanding transmission of the network key NTK_TR_CMD.

Possibly, when the network key recovery management method NTK_MGT includes a countdown CMP of a predetermined duration, the step of commanding transmission of the network key NTK_TR_CMD, following the reception of the load request sent by the terminal T, will be triggered only if the countdown CMP has not ended (countdown strictly greater than zero >0) and give a transmission authorization tr_ok. Therefore, the step of commanding transmission of the network key NTK_TR_CMD receiving the load request ntk_ld will trigger tr_trg the transmission NTK_TR of the network key on the server S to the terminal T.

If the countdown CMP has ended (countdown equal to zero 0), it prohibits the transmission tr_stp. Therefore, the step of commanding transmission of the network key NTK_TR_CMD receiving the distribution command ntk_psh will not trigger the transmission NTK_TR.

Possibly, the transmission NTK_TR will be triggered following the load request ntk_ld only if both the access point PA and the countdown CMP authorize this tr_ok. The transmission NTK_TR will not be performed following the load request ntk_ld if at least the countdown CMP prohibits this tr_stp (as the load request ntk_ld and/or the transmission authorization from the access point tr_ok is (are) received when the predetermined load time has expired) or if the access point PA does not send authorization tr_ok.

If the received network key $ntk_{PA}$ is either directly encrypted $ntk_{PA,pb\_k}$ or contained in an encrypted message $mssg_{pb\_k}(ntk_{PA})$, the terminal T decrypts the network key DCRPT respectively providing the network key $ntk_{PA}$, or the decrypted message mssg from which the network key $ntk_{PA}$ is extracted (NTK_XTR not illustrated).

Thus, the methods that are implemented make it possible to recover the network key, in particular a Wi-Fi key, of an access point automatically, securely and transparently for the user via a device of the terminal, such as an application implemented by the processor of the terminal, in particular a smartphone, a tablet, etc.

The recovery of the network key according to the invention is possibly based on an action on the access point in order to send the network key to the requesting terminal following a user or client request after inputting or capturing of a QR code or of an activation code.

The recovery of the network key according to the invention is able to be used by access points that do not have a screen, the steps of recovering the key and of connecting to the access point being reproduced by the terminal, and more particularly by way of the network key recovery means of the terminal.

The recovery of the network key may be implemented by programs executing the steps of the methods described above. In this case, the recovery of the network key implements three method/program components:
- a method implemented by the terminal, in particular in the form of a mobile application;
- a method implemented by the access point, in particular in the form of an application of the access point or "box"; and
- a method implemented by a server such as a service platform, in particular of https type.

The advantages of the network key recovery according to the invention are in particular:
- its simplicity, since the user no longer has to input the alphanumeric WEP, WPA or WPA2 key: he will receive it automatically on his terminal 1 from the access point 3;
- simply pressing on an interface of the access point will make it possible to recover the network key securely, in particular on the WPS button, which is not presently the case (this is even the point of weakness in the security of these connections to the Wi-Fi network);
- the network key is never visible on the home network, that is to say the network between the terminal 1 and the access point 2, since the network key transits on another network, such as the mobile network, and may be encrypted;
- security:
  - the encryption key or user key makes it possible to secure the transmission of the network key; and/or
  - the physical action of the user on the access point makes it possible to ensure that the user is close to the access point from which he requests to recover the network key and of which he is probably the owner.

FIG. 5 illustrates a simplified diagram of the exchanges according to the invention in one particular embodiment.

In particular, the terminal T includes a device T_APP for connecting to an access point, in particular in the form of a processor or computer implementing the steps of a network key recovery method as illustrated by FIG. 1. This is in particular an application for a mobile terminal such as a smartphone, tablet, etc.

First of all, the user U initiates (step not illustrated) the device T_APP for connecting to an access point, in particular by launching the mobile application (for example the MyLiveBox application, registered trademark).

The connection device T_APP then offers an access configuration or Internet configuration menu, in particular for determining the access points to which the terminal is able to be connected (as it is within the wireless connection range area for example). This determination in particular involves discovering access points as provided by standard by the network.

The user selects (not illustrated) the access point PA, for example his LiveBox (registered trademark), from the list of available access points (the list may include no, one or a plurality of access points) to which he wishes to connect his terminal T. The connection device T_APP then invites (not illustrated) the user to enter an identifier or an activation code of the access point, in particular to scan the QR code available on the physical housing of the access point PA.

In particular, the user U captures ID_CPT an activation code of the access point PA by way of his terminal T (photograph, scan, etc.) The activation code is either etched or printed on the housing of the access point PA or on a label affixed to the housing of the access point PA or displayed on a screen of the access point PA. The activation code is in particular a series of characters (numbers, letters or symbols), a barcode, a QR code, etc. If the activation code cdi is captured, the network key recovery method NTK_RVY includes capturing ID_CPT of the activation code cdi, in particular in the form of an image cdi_img.

In particular, if the access point PA is identified by an activation code cdi, the network key recovery method NTK_RVY includes extraction ID_XTR of the identifier of the access point $id_{PA}$ from the activation code. The QR code cdi is decoded by the connection device T_APP and includes an identifier of the access point PA (serial number or MAC address for example).

The recovery of the network key according to the invention is thus automatic, secure and transparent for the user by virtue of the method that is implemented, in particular in the form of an application, by the terminal, such as a tablet or a smartphone. In particular, the recovery of the network key is based on an action on the access point, such as a "box", in order to return the network key to the terminal, in particular to the application implemented by the terminal, following a user or client request after inputting or capturing (in particular scanning) of an activation code or of a QR code.

The network key provision method implemented by the access point does not require the access point to be equipped with a screen with a supporting display means on the access point. Specifically, the network key recovery method implemented by the terminal allows the user to follow the steps for connecting to the access point without consulting reproduction means of the access point.

In particular, the user or client will recover the network key, for example a Wi-Fi key, after a request via a recovery method, such as a mobile application, implemented by the terminal (smartphone or tablet of the user/of the client). This network key recovery involves three components, in particular implemented in the form of three software components executing the steps of the following methods:
- a recovery method implemented by the terminal, in particular in the form of a mobile application;
- a network key provision method implemented by an access point, in particular an application in the "box"; and
- a network key recovery management method implemented by a server such as a service platform of https type.

In the example of FIG. 5, the extraction of the identifier from the activation code ID_XTR requests cdi_req the identifier from a server S. The server S then reads ID_RD, depending on the identification code cdi received in the request cdi_req, the identifier of the access point $id_{PA}$ in an activation code database, in particular QR code database QR_BDD, by the server S, and returns the read identifier $id_{P4}$ to the terminal T, in particular to the connection device T_APP. The identifier request cdi_req consists in particular of an http request including the address of the server S and the activation code, for example https:\S\cdi. The server is in particular the server S used to recover the network key, or another server.

The identifier of the access point $id_{P4}$ is in particular a unique identifier such as the "Tenant Id" used in the field of the Internet of things (IoT cloud); it may consist of a MAC address or a universal unique identifier (UUID), possibly generated randomly.

On the basis of this identifier $id_{P4}$, a key A is generated and a network key request ntk_req is sent to the server S, for example to a specific address including the address of the server S and the identifier of the access point $id_{P4}$.

In particular, the connection device of the terminal T_APP creates a hash HSH of a concatenation of the identifier of the access point $id_{P4}$ received from the server S and of an identifier of the terminal, such as the IMEI (for international mobile equipment identity) code. A random number s is possibly added to this concatenation with hash. This random number is also called a salt.

In particular, the identifier of the access point $id_{P4}$ is provided to an encryption key generation KY_GN, which then provides the server S, in the network key request ntk_req(pb_k) destined for the access point, with an encryption key pb_k depending on the identifier of the access point $id_{P4}$. In our example in FIG. 5, the encryption key is generated KY_GN depending on the result $h(id_{P4}, IMEI, s)$ of the hash of the concatenation of the identifier of the access point $id_{P4}$ received from the server S and of an identifier of the terminal IMEI and of the salt s. In the case of asymmetric key generation, at least the private key A' is stored in the memory of the terminal T_MEM and the public key A is transmitted to the server S. The key pair A, A' is possibly stored in the memory of the terminal T_MEM.

The advantage of the salt s is that it avoids regenerating the same encryption keys on various pairings of the same terminal to the same access point.

The server S recovers REQ_REC the request ntk_req and, by virtue of the unique identifier $id_{P4}$, notifies the access point PA in question, in particular by relaying the network key request from the terminal ntk_req or by generating its network key request notification ntk_req ntf (not illustrated) including in particular the encryption key A.

The access point PA returns its network key, in particular WEP, WPA or WPA2 key, to the server S in a manner encrypted based on the public key A transmitted by the connection device of the terminal T_APP.

In particular, the access point PA searches NTK_SRCH, following the reception REQ_REC of the notification ntk_req ntf, for the network key of the access point PA, in particular in a memory of the access point PA_MEM or a database of the access point PA. Searching NTK_SRCH for the network key of the access point involves in particular reading the network key ntk_rd from the memory PA_MEM or any other storage device of the access point.

The access point PA possibly generates a message MSSG_GN destined for the requesting terminal T. The message mssg includes at least the read network key $ntk_{P4}$ (read from the memory for example) and is possibly encrypted by a key pb_k received in the network key request ntk_req(pb_k). The message generation MSSG_GN then in particular includes encryption CRPT using this encryption key pb_k provided by the network key request ntk_req (pb_k). The encryption CRPT encrypts either just the network key $ntk_{P4}$ or all or part of the generated message mssg including the $ntk_{P4}$.

The access point PA then transmits the network key NTK_TR, to the server S, either the encrypted or unencrypted network key $ntk_{P4}$ directly, or the generated message mssg provided by the message generation MSSG_GN, that is to say an encrypted message $mssg_{pb\_k}(ntk_{P4})$ or unencrypted message mssg $(ntk_{P4})$. In the embodiment of FIG. 5, the transmitted message is encrypted. The transmission of the network key NTK_TR by the access point, constituting provision of the network key by the access point PA on the server S, is in particular posting of the network key NTK_PST that writes the network key directly to a memory of the server S_MEM, as illustrated in FIG. 5.

The connection device of the terminal T_APP is notified ntf of the posting of the network key, in particular the Wi-Fi key in our example of an access point formed by a LiveBox, on the server S. The posting of the network key by the access point NTK_PST then triggers ntf_trg the notification T_NTF or posting notification PST_NTF.

In particular, the connection device of the terminal T_APP reproduces DSP_NTF the received notification ntf. The user is thus informed that the network key is available on the server and that he should possibly perform one or more actions from among the following, in particular within a limited time:

perform an action a on the access point PA;
request loading of the network key; etc.

The terminal possibly reproduces a countdown timer implemented by the connection device T_APP in order to implement this time limit. Thus, if the action requested by the notification, in particular pressing, is not performed in time, the information (for example the encrypted message containing the network key) on the server side is purged. In the example of FIG. 5, this period may range from a few seconds to a few minutes.

If an action on the access point is requested, when the user performs this action a, for example presses a button BT_PSH of the access point PA, such as the WPS button, the access point captures U_NTR the action a and:
either commands the server S to distribute the network key ntk_psh,
or authorizes ACK the recovery of the network key from the server.

In the case of a distribution command ntk_psh, the server S then transmits the encrypted network key $ntk_{P4,\,A}$ to the terminal connection device T_APP. In the case of a recovery authorization, the terminal connection device T_APP commands loading of the network key ntk_ld from the server S, which transmits it to the terminal connection device T_APP since it has received the authorization from the access point PA.

The network key is received by the terminal via the mobile network (4G, 3G, LTE, etc.).

The terminal connection device T_APP receives NTK_REC the network key and decrypts it DCRPT by way of the private key A' stored beforehand. The terminal connection device T_APP then makes the first connection to the access point PA_ACT by way of the decrypted network key $ntk_{P4}$. The terminal T is paired with the access point PA.

Figure 6:
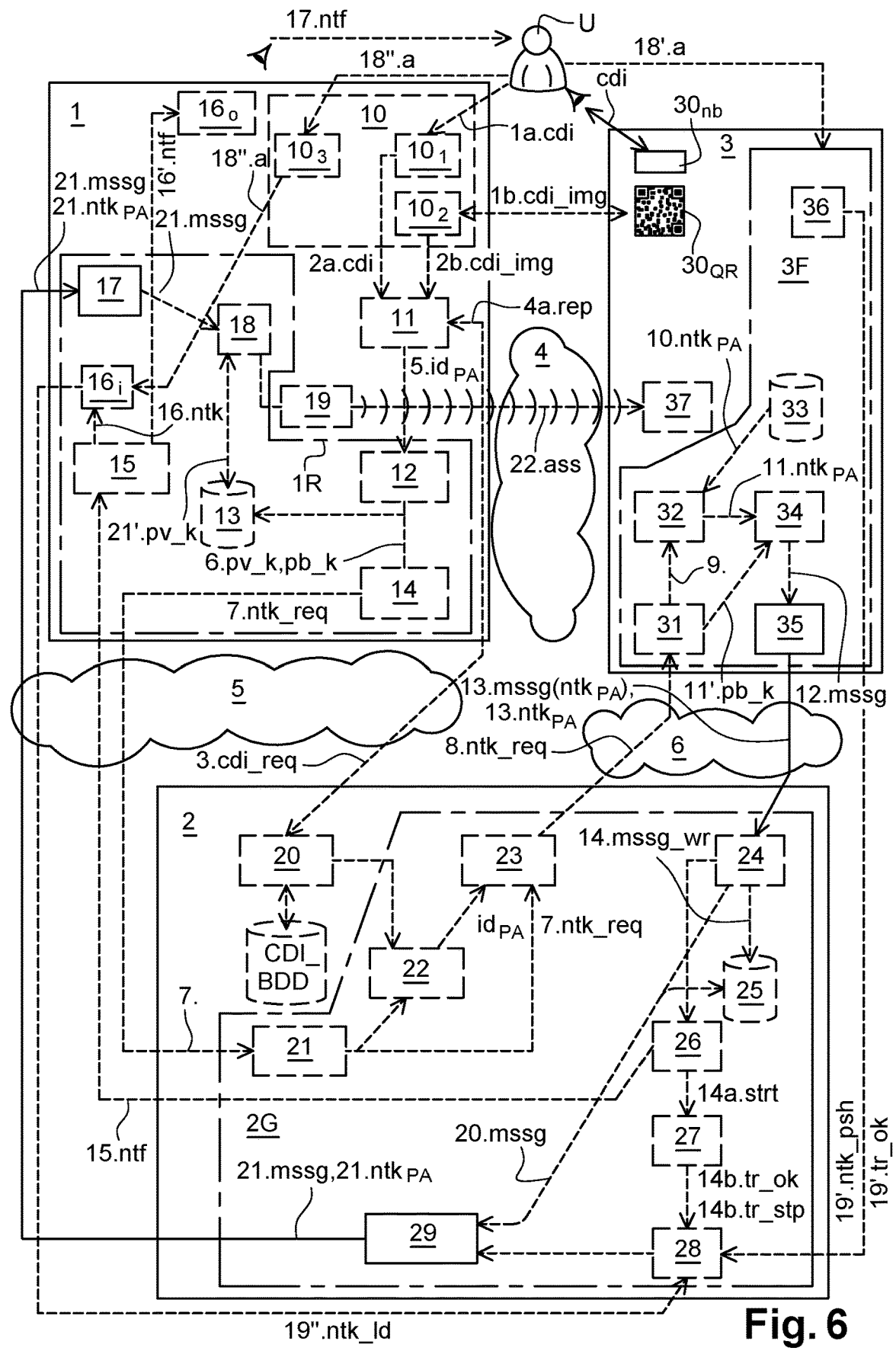
FIG. 6 shows a simplified diagram of a communication architecture including a terminal, a server and an access point according to the invention.

FIG. 6 illustrates a simplified diagram of a communication architecture including a terminal, a server and an access point according to the invention.

The communication architecture implementing the invention includes a terminal 1 that the user U wishes to connect to an access point 3 via a first communication network 4, in particular a wireless communication network such as Wi-Fi, and a server 2 used to recover the network key.

The terminal 1 includes an interface 1R for recovering a network key of an access point $ntk_{PA}$ to a network. The network key $ntk_{PA}$ allows the terminal 1 to be associated with the access point 3 upon a first connection of the terminal 1 to the access point 3. The recovery interface 1R includes a receiver 17 for receiving a network key 21.$ntk_{PA}$ provided by an access point 3 on a server 2 following a request 7.$ntk\_req$, by the terminal 1 to the server 2, for the network key of the access point. The request 7.$ntk\_req$ includes an identifier of the access point $id_{PA}$ and is relayed by the server 2 to the access point 3 associated with the identifier of the access point $id_{PA}$ in the request 7.$ntk\_req$.

The server 2 includes a manager 2G for recovering a network key of an access point to a network $ntk_{PA}$. The network key $ntk_{PA}$ allows the terminal 1 to be associated with the access point 3 upon a first connection of the terminal 1 to the access point 3. The network key recovery manager 2G includes a transmitter 29 for transmitting, to a terminal 1, a network key 21.$ntk_{PA}$ provided by an access point 3 on the server 2 following a request 7.$ntk\_req$, by the terminal 1 to the server 2, for the network key of the access point. The request 7.$ntk\_req$ includes an identifier of the access point $id_{PA}$ and is relayed by the server 2 to the access point 3 associated with the identifier of the access point $id_{PA}$ in the request 7.$ntk\_req$.

The access point 3 to a network including a network key provider 3F able to provide a terminal 1 with a network key of an access point $ntk_{PA}$ to a network is implemented by an access point 3. The network key $ntk_{PA}$ allows the terminal 1 to be associated with the access point 3 upon a first connection of the terminal 1 to the access point 3. The network key provider 3F includes a transmitter 35 for transmitting, to a server 2, destined for a terminal 1, a network key 13.$ntk_{PA}$ following a request 7.$ntk\_req$, by the terminal 1 to the server 2, for the network key of the access point 3. The request 7.$ntk\_req$ includes an identifier of the access point $id_{PA}$ and is relayed by the server 2 to the access point 3 associated with the identifier of the access point $id_{PA}$ in the request 7.$ntk\_req$.

In particular, the terminal 1 includes an identifier 11 of the access point 3 that the user U wishes to connect to the terminal 1.

In particular, when a user U wishes to connect a terminal 1 to an access point 3, he uses an input interface $10_1$ of his terminal 1 to enter an identifier or an activation code 1a.$cdi$ read from the access point 3, or a sensor $10_2$ of his terminal 1 to capture (photograph, scan, etc.) an activation code cdi of the access point 3, in particular in the form of an image 1b.$cdi\_img$. The activation code is either etched or printed on the housing of the access point 3 or on a label $30_{nb}$, $30_{QR}$ affixed to the housing of the access point 3 or displayed on a screen of the access point 3, either in the form of an alphanumeric sequence in the case of the label 30$nb$ or of a barcode or QR code in the case of the label $30_{QR}$. In particular, the user interface 10 of the terminal 1 includes an input interface $10_1$ and/or a capturing interface $10_2$ and provides activation code of the access point 3, respectively 2a.$cdi$, 2b.$cdi\_img$.

In particular, the terminal 1 includes an extractor for extracting an access point identifier 11 from the activation code 2a.$cdi$, 2b.$cdi\_img$ provided by the user interface 10. The extractor 11 in particular requests the corresponding identifier 3.$cdi\_req$ from the server 2 or from another server (not illustrated). The server 3 in particular includes a search engine 20 able to read the access point identifier corresponding the received identification code from an access point database cdi BDD and to transmit it to the terminal 1 in response 4.$rep$.

In particular, the terminal 1 includes a generator for generating encryption keys 12, such as asymmetric keys in particular providing a private key and public key pair: 6.$(pv\_k, pb\_k)$. The keys are generated depending on the access point identifier $id_{PA}$ of the access point 3. At least the private key $pv\_k$ is stored in the memory of the terminal 13.

In particular, the terminal 1 transmits REQ_TR the access point identifier in the network key request 7.$ntk\_req$ either directly or in encrypted fashion. The terminal 1 in particular includes a key generator 12 transmitting an encryption key $pb\_k$ generated depending on the identifier of the access point 3. The terminal includes a transmitter 14 for transmitting to the server 2. The transmitter 2 transmits this identifier of the access point 3 either directly in the network key request 7.$ntk\_req(id_{PA})$ destined for the access point 3, or indirectly by transmitting the encryption key generated depending on this identifier in the network key request 7.$ntk\_req(pb\_k)$. In the alternative case in which the network key request 7.$ntk\_req(pb\_k)$ includes an encryption key $pb\_k$, this encryption key $pb\_k$ will be used by the access point 3 to encrypt the network key $ntk_{PA}$ provided on the server 2 by the access point 3.

In particular, the server 2 includes a receiver 21 for receiving the network key request 7.$nkt\_req(id_{PA})$, 7.$nkt\_req(pb\_k)$ transmitted by the terminal 1 to the server 2 destined for the access point 3 depending on an identifier of the access point $id_{PA}$.

In particular, the server 2 in particular includes an extractor 22 for extracting the identifier of the access point from the network key request 7.$ntk\_req$. The extracted access point identifier $id_{PA}$ is provided to a request transmitter 23 of the server 2. The request transmitter 23 then relays the network key request 8.$ntk\_req$ received from the terminal 1 or transmits a network key request notification (not illustrated) to the access point 3 thus identified $id_{PA}$.

In particular, the access point 3 includes a receiver 31 for receiving the network key request 8.$nkt\_req(id_{PA})$, 8.$nkt\_req(pb\_k)$ relayed by the server 2 to the access point 3 depending on an identifier of the access point $id_{PA}$.

In particular, the access point 3 includes a search engine 32 for searching for the network key of the access point 10.$ntk_{PA}$, in particular in a memory of the access point 33 or a database of the access point 33. The access point 3 possibly includes a generator 34 for generating a message destined for the requesting terminal 1. The message 12.$mssg$ includes at least the read network key $ntk_{PA}$ (read from the memory for example) and is possibly encrypted by a key $pb\_k$ received in the network key request 8.$ntk\_req(pb\_k)$. The message generator 34 then in particular includes a coder $34_+$ (not illustrated) using this encryption key $pb\_k$ provided by the network key request 8.$ntk\_req(pb\_k)$. The coder $34_+$ encrypts either just the network key $ntk_{PA}$ or all or part of the generated message 12.$mssg$ including the key $ntk_{PA}$.

The access point 3 includes a transmitter 35 that then transmits, to the server 2, either the encrypted or unencrypted network key $ntk_{PA}$ directly, or the generated message 12.$mssg$ provided by the message generation MSSG_GN, that is to say an encrypted message $mssg_{pb\_k}(ntk_{PA})$ or unencrypted message $mssg$ $(ntk_{PA})$.

Following this, the server 2 including a receiver 24 receives the network key from the access point PA. The server 2 possibly stores, in a memory of the server 25, the network key following a command to write the network key 14.*mssg_wr* to the server 2, in particular transmitted by the access point 3.

The network key receiver 24 directly or indirectly triggers the transmitter 24, which transmits 21.*mssg*, 21.*ntk$_{PA}$* the network key to the requesting terminal 1 as received from the access point 3. If the transmission of the network key NTK_TR is triggered indirectly, the server 2 includes a notification generator 26 that notifies the terminal 1 of the availability of the network key by transmitting a notification message 15.*ntf* to the terminal 1. This notification 15.*ntf* possibly results from the storage of the received network key in the server 2, either by writing by the access point 3 14.*mssg_wr* or following the reception 13.*mssg* of the network key by the server 2.

Depending on the type of notification 15.*ntf*, the terminal 1 includes a notification receiver 15 and a notification reproducer 16o (in particular a screen displaying a text message and/or image and/or video and/or a speaker) that indicates 17.*ntf*, to the user, possible actions to be performed to obtain the network key available on the server 2.

The terminal 1 in particular includes a network key loader 16i triggered either automatically by the notification receiver 15 or on command from the user after an action 18'.*a* by the user U on an interface of the terminal 10$_3$ depending on the content of the notification 15.*ntf*. The network key loader 16i sends a load command 19".*ntk_ld* to a transmission controller 28 of the server 2.

The access point 3 possibly includes a supervisor 36 which, on command from the user after an action 18".*a* by the user U on an interface of the access point (not illustrated), transmits either a distribution command 19'.*ntk_psh* or a transmission authorization 19'.*tr_ok* depending on the content of the notification 15.*ntf* to a transmission controller 28 of the server 2.

The transmission controller 28 commands the transmission of the network key depending on at least one of the following messages:
- a request to load the network key 19".*ntk_ld* received from the terminal 1;
- a transmission authorization 19'.*ok_tr* provided by the access point 3 following an action by the user of the terminal 1 on the access point 3;
- a distribution command 19'.*ntk_psh* sent by the access point 3 following an action by the user of the terminal 1 on the access point 3;
- a transmission authorization 19'".*ok_tr* provided by a timer 27 of the server 2 and triggered by the notification generator 26 if the determined duration counted down by the timer has not expired; etc.

For example, after a notification 15.*ntf*, by the server 2, of the provision of the network key, depending on the mode of operation of the network key recovery NTK_MGT manager 2G to which the key is provided, the user U needs to perform an action a on the access point 3. The access point 3 includes a supervisor 36 capturing the user input and transmitting a distribution command ntk_psh to the server 2. The server 2 will receive the distribution command 19'.*ntk_psh* sent by the access point 3, which will trigger the commanding, by the transmission controller 28, of the transmission of the network key 21.*mssg*.

Possibly, when the server 2 activates 14*a*.*strt* a timer 27 having a predetermined duration, the transition controller 28 will be triggered, following the distribution command 19'.*ntk_psh* sent by the access point 3, only if the countdown of the timer 27 has not ended (countdown strictly greater than zero >0) and give a transmission authorization 14*b*.*tr_ok*. Then only the transmission controller 28 receiving distribution command 19'.*ntk_psh* will trigger the transmitter 29 to transmit the network key from the server 2 to the terminal 1.

If the timer 27 has finished its countdown (countdown equal to zero 0), it prohibits the transmission 14*b*.*tr_stp*. Therefore, the transmission controller 28 receiving the distribution command 19'.*ntk_psh* will not trigger the transmitter 29.

If the received network key ntk$_{PA}$ is either directly encrypted ntk$_{PA,pb\_k}$ or contained in an encrypted message mssg$_{pb\_k}$(ntk$_{PA}$), the terminal 1 includes a decoder 158 able to decrypt the network key using the key stored in the memory 13 and respectively providing the network key ntk$_{PA}$, or the decrypted message mssg from which the network key ntk$_{PA}$ is extracted (NTK_XTR not illustrated).

The terminal 1 then includes a network connector 19 able to connect 22.*ass* the terminal 1, via the first communication network 4, to the access point 2 using the received (and possibly decrypted) network key.

The exchanges between the terminal 1 and the server 2 are performed via a second communication network 5 separate from the first communication network 4, in particular a mobile communication network that is more secure than the Wi-Fi network used as first communication network 4.

The exchanges between the server 2 and the access point 3 are performed via a third communication network 6 separate from the first communication network 4, in particular a mobile communication network different from or identical to the second communication network or a wired communication network.

The system implementing the invention, namely the terminal 1, the access point 3 and the server 2, is based, in its most secure version, on the encryption and the identification of the user from the access point with validation through a "physical" action on the access point in order to avoid key theft.

In particular, the system is made up of the following elements:
- a terminal 1 including a processor implementing a mobile application executing the steps of the network key recovery method NTK_RVY;
- a server 2 that will serve to store the encryption key for the access point 3 and the network key for the terminal 1;
- an access point assembly (such as Internet boxes linked to an Internet network) to whose access point 3 the user wishes to connect the terminal 1;
- an activation code (such as a QR code) displayed on or affixed to the access point and making it possible to create the link between the terminal 1 and the chosen access point 3.

The invention also targets a medium. The information medium may be any entity or device capable of storing the program. For example, the medium may include a storage means, such as a ROM, for example a CD-ROM or a microelectronic circuit ROM, or else a magnetic recording means, for example a floppy disk or a hard disk. Moreover, the information medium may be a transmissible medium such as an electrical or optical signal, which may be routed via an electrical or optical cable, by radio or by other means. The program according to the invention may in particular be downloaded from a network, in particular from the Internet. As an alternative, the information medium may be an integrated circuit in which the program is incorporated, the circuit being designed to execute or to be used in the execution of the method in question.

In another implementation, the invention is implemented by way of software and/or hardware components. With this in mind, the term "module" may correspond equally to a software component or to a hardware component. A software component corresponds to one or more computer programs, one or more subroutines of a program or, more generally, to any element of a program or of software that is able to implement a function or a set of functions in accordance with the above description. A hardware component corresponds to any element of a hardware assembly that is able to implement a function or a set of functions.

Although the present disclosure has been described with reference to one or more examples, workers skilled in the art will recognize that changes may be made in form and detail without departing from the scope of the disclosure and/or the appended claims.

The invention claimed is:

1. A method for recovering a network key of an access point to a third communication network, the access point being implemented in a first local network and providing to terminals associated with the access point in the first local network access to the third communication network, the method comprising the following acts implemented by a terminal:
   sending, via a second communication network, a request to a server for the network key of the access point, the request including an identifier of the access point of the first local network; and
   receiving, via the second communication network, from the server the access point's network key provided by the access point via the third communication network to the server following the request, the request having been relayed by the server to the access point associated with the identifier of the access point in the request, the access point's network key allowing the terminal to connect to the access point over the first local network and be associated with the access point in the first local network upon a first connection of the terminal to the access point via the first local network,
   wherein the first local network, the second communication network and the third communication network, are different networks.

2. The method for according to claim 1, wherein the network key received by the terminal is contained in an encrypted message transmitted by the access point to the server.

3. The method according to claim 2, wherein the method includes decryption, by way of a private key generated by the terminal with a public key based on the identifier of the access point, of the encrypted message transmitted by the access point to the server, the message having been encrypted with the public key, which is transmitted by the terminal to the access point, and includes the network key of the access point.

4. The method according to claim 1, wherein the method includes generation of an asymmetric key pair including a public key and a private key that are generated based on the identifier of the access point, the public key constituting the access point identifier contained in the request and encrypting the network key received by the terminal.

5. The method for according to claim 1, wherein the method includes transmission of a public key generated based on the identifier of the access point to the access point, the public key constituting the access point identifier contained in the request and encrypting the network key received by the terminal.

6. The method according to claim 1, wherein the method includes reception of a message from the access point, the message being encrypted with a public key and including the network key, the public key being generated based on the identifier of the access point constituting the access point identifier contained in the request.

7. The method according to claim 1, wherein the method includes reception, by the terminal, of a notification of availability of the network key transmitted by the server following reception, by the server, of the network key from the access point, said reception of the notification authorizing the terminal to recover the network key from the server.

8. The method for according to claim 1, wherein, after the network key is provided on the server by the access point, the reception of the network key by the terminal is triggered by the access point following a physical action on the access point by a user of the terminal.

9. The method according to claim 1, wherein the provision of the network key on the server by the access point has a limited duration.

10. The method according to claim 1, wherein the second communication network is a mobile network.

11. A method implemented by a server for managing recovery of a network key of an access point to a third communication network, the access point being implemented in a first local network and providing to terminals associated with the access point in the first local network access to the third communication network, the method comprising:
    receiving, via a second communication network, a request from a terminal for the network key of the access point, the request including an identifier of the access point of the first local network;
    relaying, via the third communication network, the request to the access point associated with the identifier of the access point in the request;
    receiving, via the third communication network, the access point's network key from the access point associated with the identifier of the access point in the request; and
    transmitting by the server to the terminal, via the second communication network, the network key provided by the access point on the server following the request, the access point's network key allowing the terminal to connect to the access point over the first local network and be associated with the access point in the first local network upon a first connection of the terminal to the access point via the first local network,
    wherein the first local network, the second communication network and the third communication network, are different networks.

12. The method according to claim 11, wherein the second communication network is a mobile network.

13. A method for providing a terminal with a network key of an access point to a third communication network, the access point being implemented in a first local network and providing to terminals associated with the access point in the first local network access to the third communication network, the method being implemented by the access point and comprising:
    receiving from a server, via the third communication network, a request for the network key of the access point, the request being sent by the terminal, via the second communication network, and relayed to the access point by the server, the request including an identifier of the access point of the first local network; and transmitting by the access point to the server, destined for the terminal, via the third communication network, the access point's network key following receipt of the request, the access point's network key allowing the terminal to connect to the access point over the first local network and be associated with the access point in the first local network upon a first connection of the terminal to the access point via the first local network, wherein the first local network, the second communication network and the third communication network, are different networks.

14. The method according to claim 13, wherein the second communication network is a mobile network.

15. A non-transitory computer-readable medium comprising program code instructions stored thereon, which when executed by a processor of a terminal configure the terminal to perform acts comprising:

recovering a network key of an access point to a third communication network, the access point being implemented in a first local network and providing to terminals associated with the access point in the first local network access to the third communication network, by:

sending, via a second communication network, a request to a server for the network key of the access point, the request including an identifier of the access point of the first local network; and receiving, via the second communication network, from the server the access point's network key provided by the access point via the third communication network to the server following the request, the request having been relayed by the server to the access point associated with the identifier of the access point in the request, the access point's network key allowing the terminal to connect to the access point over the first local network and be associated with the access point in the first local network upon a first connection of the terminal to the access point via the first local network, wherein the first local network, the second communication network and the third communication network, are different networks.

16. The non-transitory computer-readable medium according to claim 15, wherein the second communication network is a mobile network.

17. A terminal comprising:
a transmitter;
a receiver;
a processor; and
a non-transitory computer-readable medium comprising program code instructions stored thereon, which when executed by the processor configure the terminal to recover a network key of an access point to a third communication network, the access point being implemented in a first local network and providing to terminals associated with the access point in the first local network access to the third communication network, by:

sending, via a second communication network, with the transmitter a request to a server for the network key of the access point, the request including an identifier of the access point of the first local network; and receiving, via the second communication network, with the receiver from the server the access point's network key provided by the access point via the third communication network to the server following the request, the request having been relayed by the server to the access point associated with the identifier of the access point in the request, the access point's network key allowing the terminal to connect to the access point over the first local network and be associated with the access point in the first local network upon a first connection of the terminal to the access point via the first local network, wherein the first local network, the second communication network and the third communication network, are different networks.

18. A server comprising:
a processor; and
a non-transitory computer-readable medium comprising program code instructions stored thereon, which when executed by the processor configure the server to manage recovery of a network key of an access point to a third communication network by:

receiving, via a second communication network, a request from a terminal for the network key of the access point, the request including an identifier of the access point of a first local network, the access point being implemented in the first local network and providing to terminals associated with the access point in the first local network access to the third communication network;

relaying, via the third communication network, the request to the access point associated with the identifier of the access point in the request;

receiving, via the third communication network, the access point's network key from the access point associated with the identifier of the access point in the request; and transmitting by the server to the terminal, via the second communication network, the network key provided by the access point on the server following the request, the access point's network key allowing the terminal to connect to the access point over the first local network and be associated with the access point in the first local network upon a first connection of the terminal to the access point via the first local network, wherein the first local network, the second communication network and the third communication network, are different networks.

19. An access point to a third communication network, the access point being implemented in a first local network and providing to terminals associated with the access point in the first local network access to the third communication network, the access point comprising:

a processor; and
a non-transitory computer-readable medium comprising program code instructions stored thereon, which when executed by the processor configure the access point to provide a terminal with a network key of the access point by:

receiving from a server, via the third communication network, a request for the network key of the access point, the request being sent by the terminal, via the second communication network, and relayed to the access point by the server, the request including an identifier of the access point of the first local network; and transmitting by the access point to the server, destined for the terminal, via the third communication network, the access point's network key following receipt of the request, the access point's network key allowing the terminal to connect to the access point over the first local network and be associated with the access point in the first local network upon a first connection of the terminal to the access point via the first local network, wherein the first local network, the second communication network and the third communication network, are different networks.

* * * * *